US005706457A

United States Patent [19]
Dwyer et al.

[11] Patent Number: 5,706,457
[45] Date of Patent: Jan. 6, 1998

[54] IMAGE DISPLAY AND ARCHIVING SYSTEM AND METHOD

[75] Inventors: Douglas A. Dwyer, Brea; James E. Handy, Huntington Beach; Paul E. Curry, Placentia; Rick E. Pflugshaupt, Fullerton; Kevin B. Grant, Anaheim, all of Calif.

[73] Assignee: Hughes Electronics, Los Angeles, Calif.

[21] Appl. No.: 473,831

[22] Filed: Jun. 7, 1995

[51] Int. Cl.[6] .................. G06F 3/14; G06F 17/40; G06T 1/60
[52] U.S. Cl. ............ 395/349; 395/966; 395/792; 395/115; 395/348; 358/403; 358/444
[58] Field of Search .................. 395/349–351, 395/346, 965–967, 970, 348, 354, 773, 792, 680, 114, 115, 326, 340, 352, 761, 155–157, 159, 161, 144, 147, 650; 358/403, 401, 442, 444; 382/305, 306

[56] References Cited

U.S. PATENT DOCUMENTS

| | | | |
|---|---|---|---|
| 4,899,136 | 2/1990 | Beard et al. | 395/349 X |
| 5,060,135 | 10/1991 | Levine et al. | 395/351 |
| 5,235,680 | 8/1993 | Bijnagte | 395/610 |
| 5,321,520 | 6/1994 | Inga et al. | 358/403 |
| 5,349,658 | 9/1994 | O'Rourke et al. | 395/349 |
| 5,369,508 | 11/1994 | Lech et al. | 382/305 X |
| 5,406,384 | 4/1995 | Sakuragi | 358/403 |
| 5,602,936 | 2/1997 | Green et al. | 382/305 X |

*Primary Examiner*—Raymond J. Bayerl
*Attorney, Agent, or Firm*—Leonard A. Alkov; Wanda K. Denson-Low

[57] ABSTRACT

A system 10 and methods for acquiring and archiving images derived from multiple sources with minimal operator interaction and understanding of the archiving computer 11. The system 10 and methods provide for reception of digitized images via modem 24 from a remote source, and the input of images from local sources including a digital photographic image source 25 such as a digital camera or 35 millimeter digitizing camera data back, an optical scanner 23, and digitized images previously stored on magneto-optical disk or digital audio tape. The system 10 also archives and distributes image and document data to multiple destinations, including a magneto-optical drive 22, digital or hard disk drive 15, and to laser or photographic quality continuous tone printers 26, 27. One key aspect of the system 10 and methods is that the operator is not given access to the operating system of the computer 11 and can only perform a predetermined set of functions that correspond to graphical icons 30 disposed on the computer desktop 17 (monitor 12). Each of the icons 30 launches a set of linked macro functions that initialize the modem 24, control data transfer, format the received image data into a predetermined format, attach textual data to the image files, and automatically archive or print the files. Submenus are provided during operation that permit certain selected actions related to the macro that is being run.

15 Claims, 12 Drawing Sheets

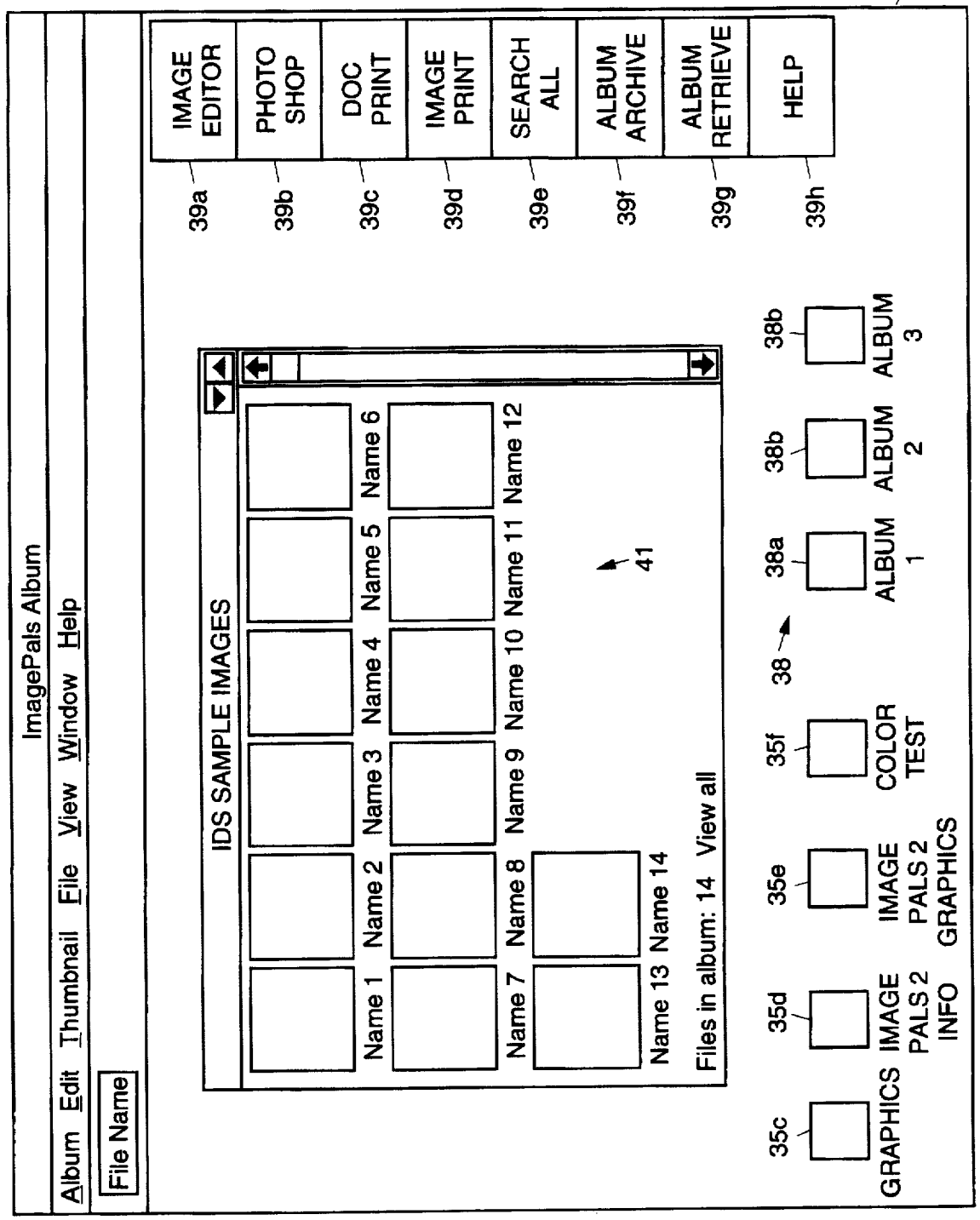

IMAGE DISPLAY AND ARCHIVING SYSTEM AND METHOD

BACKGROUND

The present invention relates generally to computer systems, and more particularly, to an image display system that provides for multiple source acquisition and multiple destination distribution of image and document data.

There are certain image-related endeavors that require the acquisition, digitizing, manipulation, transfer and storage of large volumes of images. Such endeavors include obtaining and archiving photographic evidence and news photographs, and the like. The particular application for which the present invention was developed involves the generation of a large number of photographs at one location where they are digitized, and then the transmission of these digitized photographs via modem to a remote location where they are catalogued and archived.

The reception, and archiving of this data is time consuming and involves the use of many different software programs. Consequently, it has heretofore been necessary that the computer operator that transfers and archives the digitized photographs be relatively well-trained and have an understanding of the different programs that are used to receive, manipulate and archive the photographic data. The present invention was developed to eliminate the need for a well-trained individual to perform the reception and archiving tasks. The present invention was also developed to permit the reception of documents 24 hours a day in an unattended mode, thus eliminating operator interaction.

Accordingly, it is an objective of the present invention to provide for an image display system that permits multiple source acquisition and multiple destination distribution of image and document data.

SUMMARY OF THE INVENTION

To meet the above and other objectives, the present invention is an image display system and methods that provides for the acquisition and archiving of images derived from multiple sources with minimal operator interaction and understanding of the archiving computer system. The present invention provides for reception of digitized images via modem from a remote location, and the input of images from local sources including digital cameras and 35 millimeter digitizing camera data backs, an optical scanner, and digitized images previously stored on magneto-optical disk or digital audio tape. The present invention also archives and distributes image and document data to multiple destinations, including magneto-optical or other storage devices and laser or photographic quality continuous tone printers.

One key aspect of the present invention is that the operator is not given access to the operating system of the computer and as such can only perform a predetermined set of functions that correspond to graphical icons disposed on the computer desktop (monitor). Each of the icons launches a set of linked macro functions that initialize the modem, control data transfer, format the received image data into a predetermined format, attach textual data to the image files, and automatically archive or print the files. Submenus are provided during operation that permit certain selected actions related to the macro that is being run.

The present invention receives image data via a modem, magneto-optical disk, digital camera, or digital audio tape, for example. Image data may be acquired from a document scanner or by accessing photo data from a DCS 200 digital camera or a HitchHiker-type digital camera back, for example. Images may be printed on a laser printer or a photographic quality continuous tone printer.

The present image display system and methods reduces repetitive operator intensive image processing tasks to a simple clicking of a computer mouse pointer to select an icon associated with the desired task to be performed. The present invention provides automated tools specifically designed for image acquisition and archiving. The main menu or desktop of the image display system displays the tools as icons that are launched by clicking them with the mouse pointer. Thumbnail images are created for the image files processed by the automated tools, and incoming files are stored in albums. In addition, text data from camera archive type files (digital camera or camera back) are extracted from the files. The time and date when a picture was taken along with the serial number of the camera are automatically appended to the thumbnail image files.

The following automated functions (tools) are provided by the image display system and methods: transfer Macintosh magneto-optical camera archive data to an album, transfer digital camera or camera back data to an album, receive data via modem and transfer the data to an album, transfer film digitizer tape data to an album, scan black and whim image to an album, scan gray scale image to an album, scan color image to an album, print an image (album menu), archive an album to a magneto-optical disk (album menu), and retrieve images from a magneto-optical archive disk (album menu).

The image display system allows a non-technical operator with little or no training to process images received from remote locations, print out the received images, and archive the images onto removable storage media. The available functions are limited to specific image processing functions. The system is highly automated. By invoking macros, the image display system saves an operator several hundreds of key strokes compared with using individual stand-alone software packages. The macros open multiple software applications, perform specific commands required for each application, store image data, and purge excess or redundant data from the system.

The image display system saves time by performing repeated operations from a single operator input command. There is no single software package that performs the specific tasks. While multiple software packages may be used to perform the tasks implemented by the present invention, these packages require extensive technical expertise and require hundreds of times the amount of operator input to perform the same tasks. The present invention allows non-technical operators to perform image processing tasks that would otherwise require trained technical personnel. The present invention saves time by eliminating operator required input. Repeated processes are performed automatically.

The present invention may be readily employed by news services, newspapers, and magazines, and the like. Photograph shops can benefit from the present invention which permits processing of all electronic photographs and copying and printing thereof. Art stores can benefit from the present invention which permits image storage and manipulation, and receipt and processing of new art. Vehicle toll collection systems can benefit from the present invention which provides a workstation for manual reading of license plate images taken from toll roads.

The automated tools of the image display system save time by emulating the multiple steps required by an operator to perform specific image processing tasks. The following software packages are used in whole or in part to perform subtasks of the automated functions. The image display system integrates a variety of commercial software packages such that technical expertise regarding these items are not required. The software packages integrated into a reduced to practice version of the present system include Adaptec SCSI Interrogator 1.31 SCSI hardware driver, Adobe Photoshop 2.5.1 image editing, printing, scaling, graphics program, Corel SCSI 1.13 system backup and retoration utility program, Deskscan II 2.0 scanner, DOS 6.2 operating system software, Image Pals 2.0 operating software, Kodak TWAIN Drivers 4.6 RC 7 camera controller software, MacSEE 3.2, Norton Desktop 32.2, NovaTAR for DOS 2.01, QuinZip for Windows, 2.0 image file unpacking utility program, PC Tools for Windows 7.1, Procomm Plus for Windows modern communications program, Prokey for Windows 1.0, Prokey for DOS 5.1, SuperQueue 2.20, WatchDog 703, and Windows 3.1.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 2a shows an album menu of the image display system of FIG. 1; and

DETAILED DESCRIPTION

Figure 1:
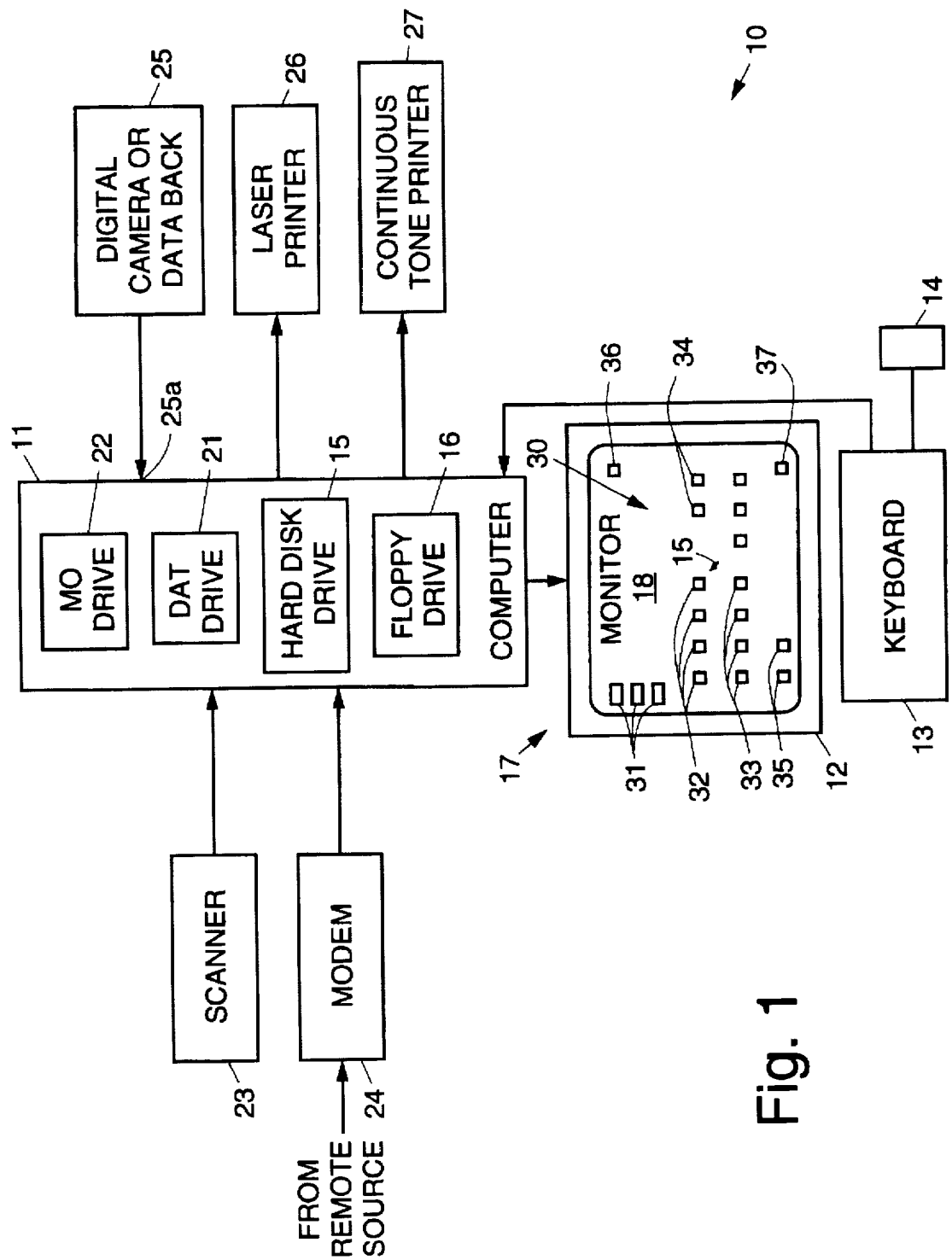
FIG. 1 shows a block diagram of an image display system in accordance with the present invention.

Referring to the drawing figures, FIG. 1 shows a block diagram of an image display system 10 in accordance with the present invention. The image display system 10 is comprised of a computer 11, such as an IBM compatible computer 11 containing an Intel 486 processor running at 66 MHz, for example. The computer 11 includes an internal hard disk drive 15, one or more floppy disk drives 16, a digital audio tape (DAT) drive 21, and a magneto-optical (MO) disk drive 22. Connected to the computer 11 are a scanner 23 for scanning images into the computer 11, a telephone or wireless modem 24 for receiving image files from a remotely located source, a monitor 12, a keyboard 13, a mouse pointer 14, and laser and continuous tone printers 26, 27. An interface 25a is provided for connecting the computer 11 to a digital photographic image source 25 such as a digital camera 25, or a digital data back 25 that attaches to a camera to permit transfer of images therefrom. The mouse pointer 14 has a cursor 15 that is displayed on the monitor 12 that is used to select graphical icons 30 disposed on a computer desktop 17 (screen) that are representative of hard disks 31, floppy disk drive 16, applications 32, image acquisition tools 33, utility functions 34, 35, 36, and a slide show display function 37.

A reduced to practice version of the image display system 10 comprises a ZEOS 486 66 MHz computer processor having 1 gigabyte internal hard disk drive 15, a 5.5 inch high density floppy disk drive 16, a 3.5 inch high density floppy drive 16, the digital audio tape drive, a 120 megabyte magneto-optical disk drive 22, a Adaptec SCSI driver card, a Future Domain SCSI driver card, a Diamond Speedstar 24x display driver card, the keyboard 13 and the mouse pointer 14. The computer processor is interfaced to a NEC MultiSync SFG color monitor 12, a Hewlett Packard LaserJet 4 postscript printer 26, a HP flatbed scanner 23, a Kodak XLT 7720 continuous tone printer 27, a World Blazer modem 24 and power adapter, and a 110 volt power conditioner and power strip along with power cables are provided. The interconnection and operation of these components are well understood by those skilled in the art and will not be described herein.

An important aspect of the present invention is that an operator is isolated from the operating system of the computer 11 because of the way in which the graphical icons 30 are designed. Consequently, the operator is allowed to perform only a predetermined set of image processing functions that correspond to the graphical icons 30. Each of the icons 30 launches a set of linked macro functions that perform a variety of tasks, including initializing the modem 24, controlling data transfer from the remote source by way of the modem 24, or from the scanner 23, digital camera 25 or data back 25, the digital audio tape drive 21, or the magneto-optical disk drive 22, formatting received image data into a predetermined format, attaching textual data to the image files, and automatically archiving or printing the files. These functions are performed by executing macros that operate the commercial software programs. Another important aspect of the present invention is that these macros are designed to operate the commercial programs in a consistent manner. This prevents the operator from eliminating critical processing steps and processing image data with an inconsistent format. Submenus are presented during operation that permit certain selected actions related to the function or operation that is being performed.

The image display system 10 provides acquisition of image and document data from multiple sources and distribution of the data to multiple destinations. The image display system 10 can receive image data via the modem 24, magneto optical disks, the digital camera 25, or digital audio tapes that contain digitized film images. Image data may be acquired using the scanner 23 or by accessing photographic data from the digital camera 25 such as a DCS 200 camera 25, or a digital data back 25 such as a HitchHiker. Images may be printed out on either the laser printer 26 or the photographic quality continuous tone printer 27.

Figure 2:
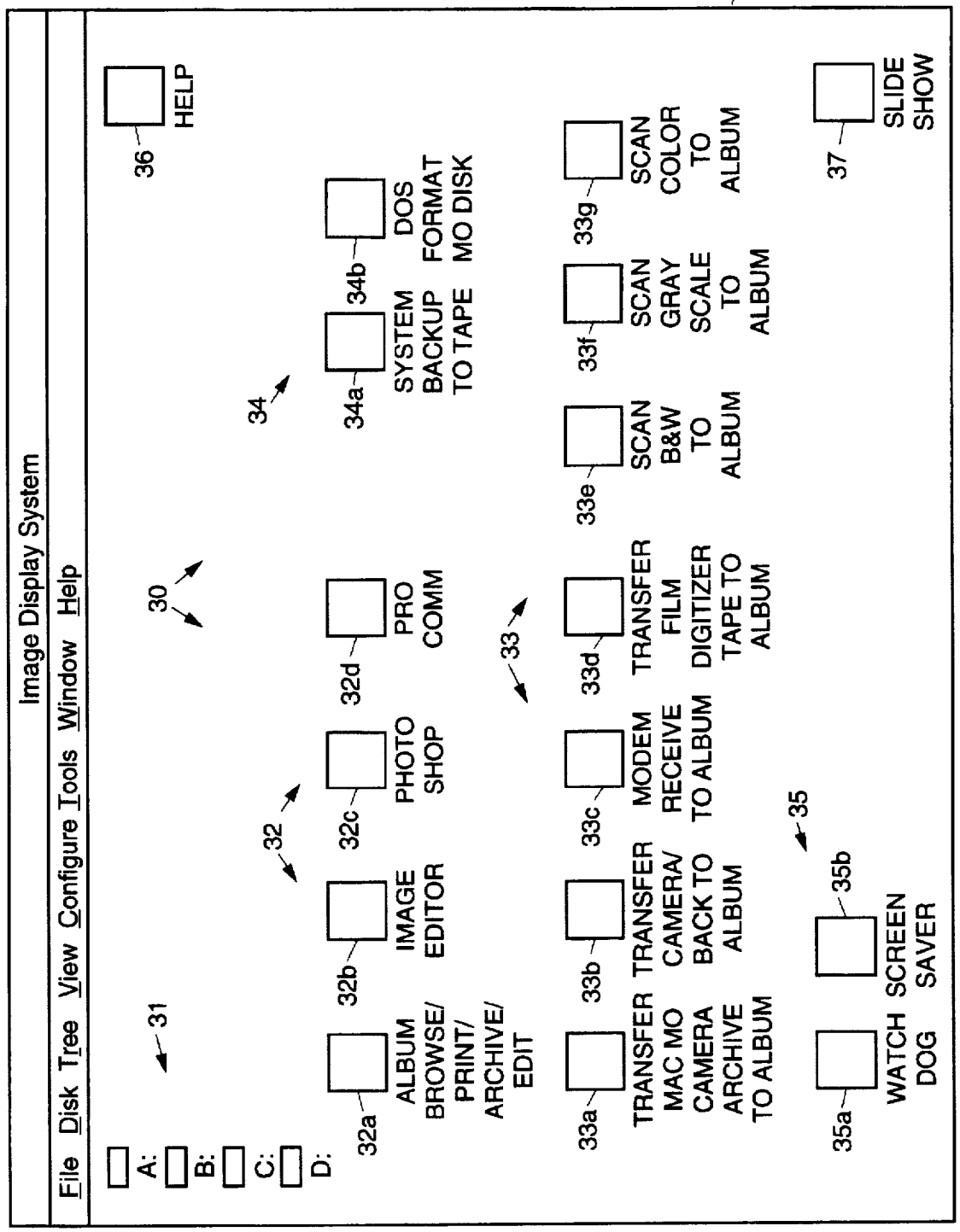
FIG. 2 shows a main display screen or menu of the image display system of FIG. 1.

FIG. 2 shows a main display screen or menu 18 of the image display system 10 of FIG. 1. The image display system 10 provides automated tools 30 that are specifically designed for image acquisition and archiving. The main menu 18 of the image display system 10 displays the tools 30 as icons 30 that are launched by clicking on them with the mouse pointer 14. Images received using the automated tools automatically create thumbnail images 41 (shown in FIG. 2a) and store the incoming files as albums 38 (shown in FIG. 2a). In addition, text data from camera archive type files are extracted. The time and date when a picture was taken along with the serial number of the camera 25 are automatically appended to the thumbnail images 41.

FIG. 2a shows an album menu 18a of the image display system 10. The thumbnail images 41 are displayed on the album menu 18a shown in FIG. 2a. The thumbnail images 41 provide an operator with a quick look at all new images without having to open each file. The albums 38 can be archived and retrieved on removable magneto-optical disks using automated tools in the album menu 18a.

The automated tools 30 of the image display system 10 include system backup to digital audio tape (icon 34a), DOS format of a magneto-optical disk (icon 34b), transfer Macintosh magneto-optical camera archive data to an album (icon 33a), transfer digital camera 25 or camera back 25 data to an album (icon 33b), receive data via modem 24 and transfer the data to an album (icon 33c), transfer film digitizer tape to an album (icon 33d), scan black and white image to an album (icon 33e), scan gray scale image to an album (icon 33f), scan color image to an album (icon 33g), print an image (icon 39d, album menu 18a), archive an album (icon 39f, album menu 18a), and retrieve images from magneto-optical disk (icon 39g, album menu 18a), search albums (icon 39e, album menu 18a), print document (icon 39c, album menu 18a), and a help menu (icon 36, main menu 18 and icon 39h, album menu 18a).

The software packages that are integrated into a reduced to practice version of the system 10 include Adaptec SCSI Interrogator 1.31 which is a hardware driver that controls the SCSI interface, an Adobe Photoshop 2.5.1 program which is an image editing, printing, scaling, graphics program, a Corel SCSI 1.13 utility program which is a system backup and restoration utility program, a Deskscan II 2.0 program which operates the scanner 23, a DOS 6.2 operating system which is part of the computer operating system and allows other programs to ran, an ImagePals 2.0 program which is an image editor and album creator, Kodak TWAIN Drivers 4.6 RC 7 which provide camera control for the Photoshop and ImagePals software, a MacSEE 3.2 disk utility program allows the computer to read from and write to Macintosh disks, a Desktop 32.2 utility program which is a utility program that is used to create and run desktop and batch file macros, a NovaTAR for DOS 2.01 file transfer program is a utility program that reads to and writes to digital audio tape, a QuinZip for Windows 2.0 utility program which is a utility program that unpacks individual image files from a modem receive file, a PC Tools for Windows 7.1 utility program which is a utility program that decrypts image files, a Procomm Plus for Windows communication program which is a communications program that controls the modem 22, a Prokey for Windows 1.0 utility program and a Prokey for DOS 5.1 utility program which are utility programs that allow a user to write macros using mouse points and clicks, SuperQueue 2.20 which spools print jobs to printers 26, 27, a WatchDog 703 security program which is a security program that provides user logon at power up, and a Windows 3.1 operating system which is part of the operating system and allows other programs to run on the computer 11.

Flow diagrams are shown in FIGS. 3–10 that illustrate some of the automated tools 30 used in processing image input and output files and data. The balance of the icons 30 that are not specifically discussed have simple macros or are application icons or aliases that correspond to the specific task. The construction of these icons 30 is considered routine to those skilled in the art.

Figure 3:
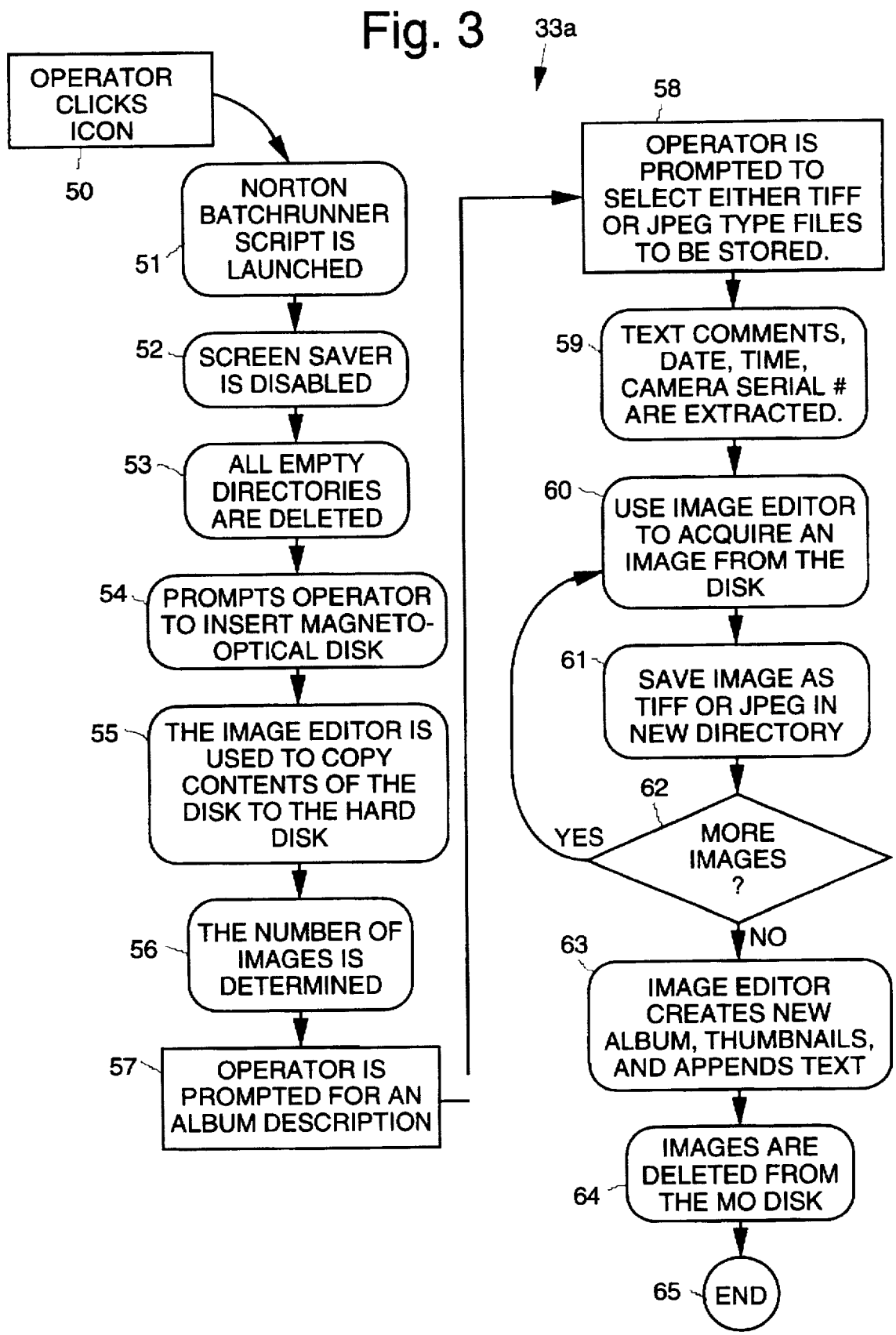
FIGS. 3–9 are flow diagrams illustrating procedures implemented by the automated tools of the image display system and that are used to process image input and output data.

FIG. 3 is a flow diagram illustrating the macro performed by activating the transfer Macintosh magneto-optical camera archive to album icon 33a. The Norton Desktop program has been used to create a Norton BatchRunner script 51 that is launched 50 by clicking the icon 33a. The BatchRunner script is programmed to perform the specific tasks shown in FIG. 3. First, the screen saver 35b is disabled 52. Then all empty directories are deleted 53. A screen display is generated that prompts 54 the operator to insert a magneto-optical disk into the magneto-optical disk drive 22. The macro then launches 55 the image editor 32b which is used to copy the contents of the magneto-optical disk to the desktop 17. The number of images contained on the magneto-optical disk is determined 56. The operator is then prompted 57 for an album description or name, and is prompted 58 to select the type of image file that is to be stored. The image editor 32b has been preprogrammed to extract 59 or read 59 text comments, the date, the time, and the camera serial number from the magneto-optical disk. The image editor 32b has been programmed to acquire 60 or read 60 an image from the magneto-optical disk, and the read image is saved 61 as a TIFF or JPEG image in a newly created directory. The macro cycles 62 to continue to read all image files contained in the magneto-optical disk. Once all images have been read and stored in the directory, the image editor 32b creates 63 a new album 38, thumbnail images 41 for each image in the album 38, and appends the extracted text data 59 to the thumbnail images 41. Once the images are stored in the new album 38, the images are deleted 64 from the magneto-optical disk, and the macro ends 65.

Figure 4:
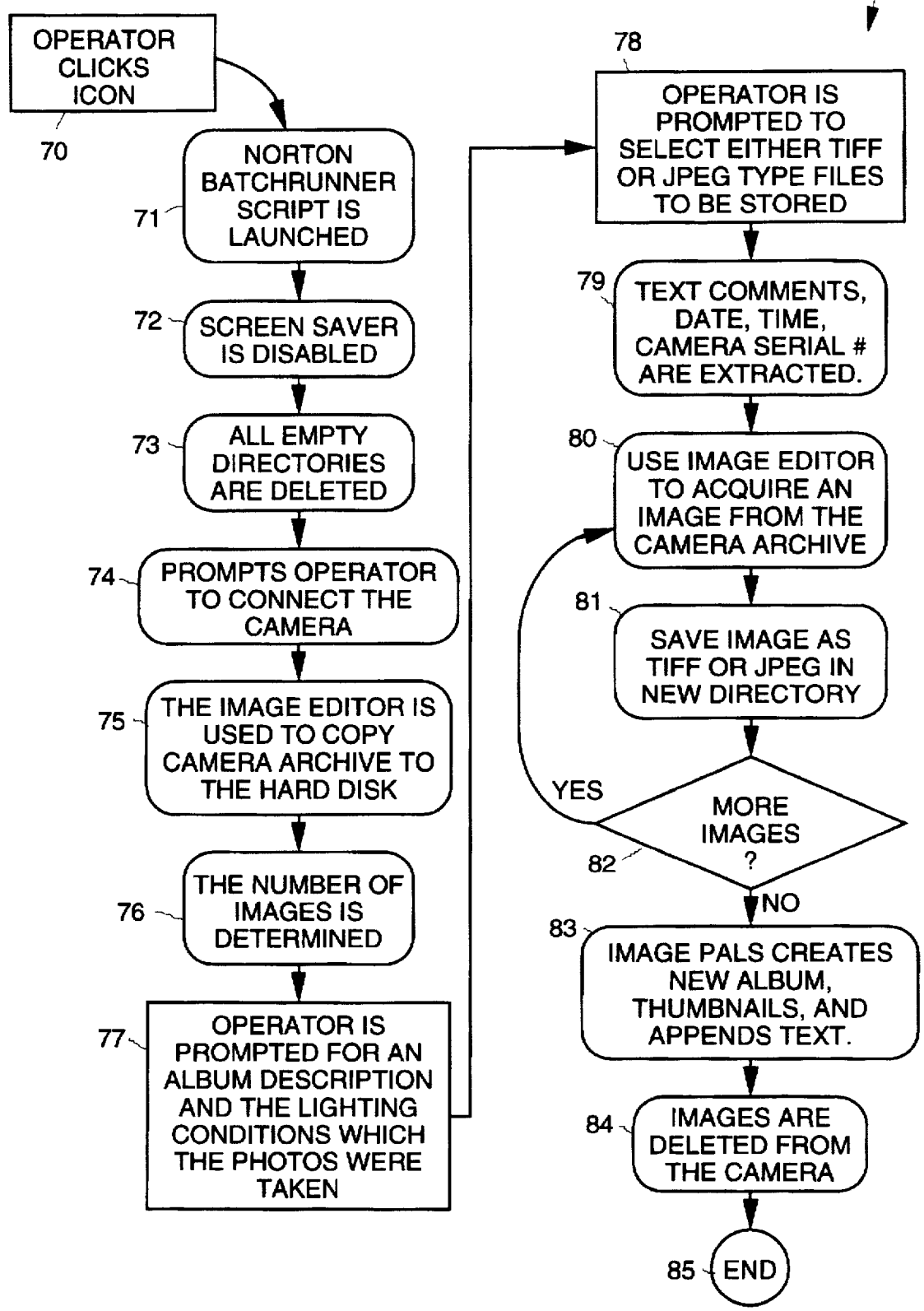

FIG. 4 is a flow diagram illustrating the macro performed by activating the transfer camera to album icon 33b. The Norton Desktop program has been used to create a Norton BatchRunner script 61 that is launched 60 by clicking the icon 33b. The BatchRunner script is programmed to perform the specific tasks shown in FIG. 4. First, the screen saver 35b is disabled 72. Then all empty directories are deleted 73. A screen display is generated that prompts 74 the operator to connect the camera or camera back 25. The macro then launches 75 the image editor 32b which is used to copy the contents of the camera or camera back 25 to the desktop 17. The number of images contained on the magneto-optical disk is determined 76. The operator is then prompted 77 for an album description or name, and for lighting conditions under which the photographs were taken. The operator is then prompted 78 to select the type of image file that is to be stored. The image editor 32b has been preprogrammed to extract 79 or read 79 text comments, the date, the time, and the camera serial number from the camera or camera back 25. The image editor 32b has been programmed to acquire 80 or read 80 an image from the camera or camera back 25, and the read image is saved 81 as a TIFF or JPEG image in a newly created directory. The macro cycles 82 to continue to read all image files contained in the camera or camera back 25. Once all images have been read and stored in the directory, the image editor 32b creates 83 a new album 38, thumbnails 41 for each image in the album 38, and appends the extracted text data 79 to the thumbnail images 41. Once the images are stored in the new album 38, the images are deleted 84 from the camera or camera back 25, and the macro ends 85.

Figure 5:
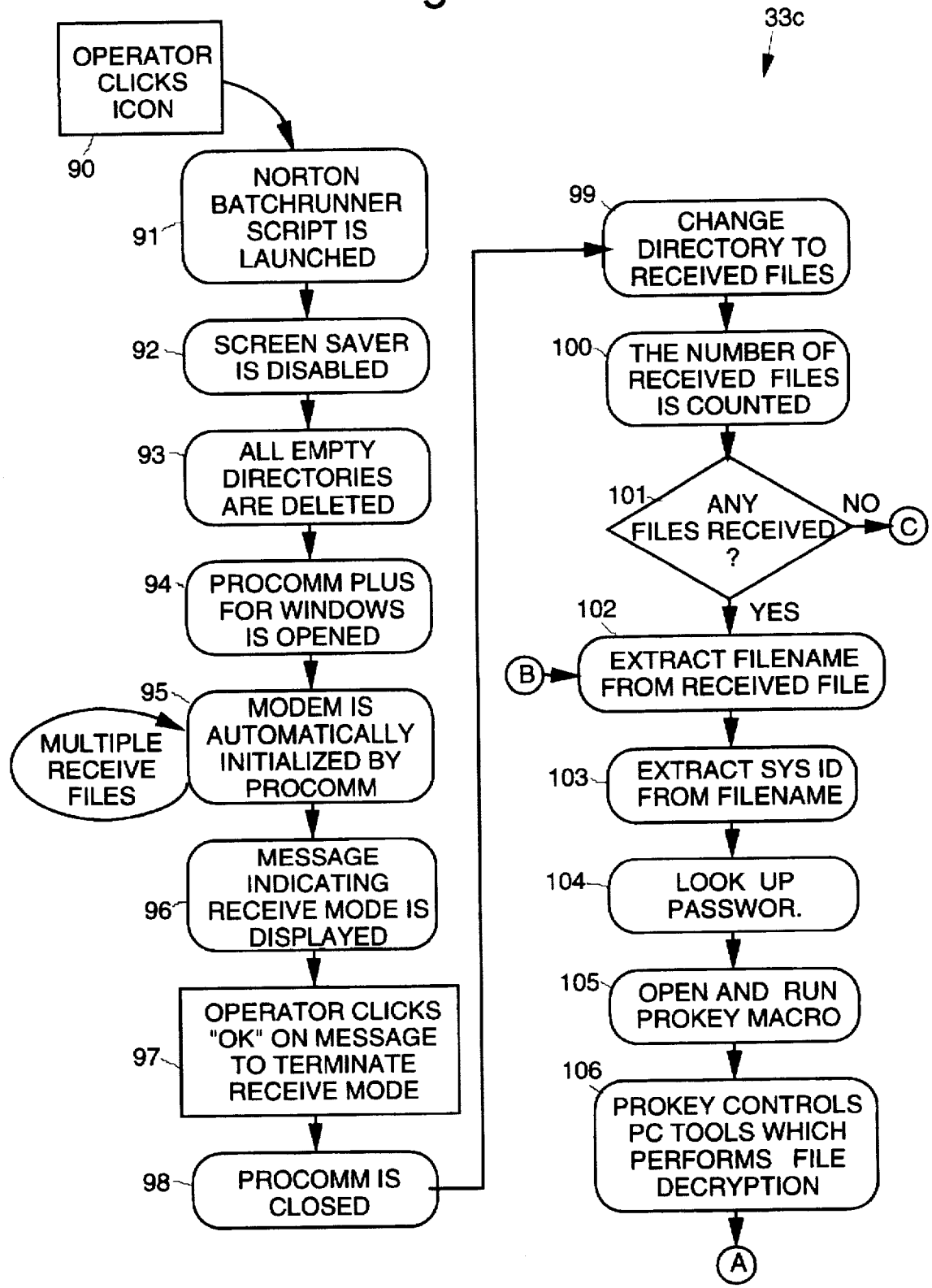
Figure 5A:
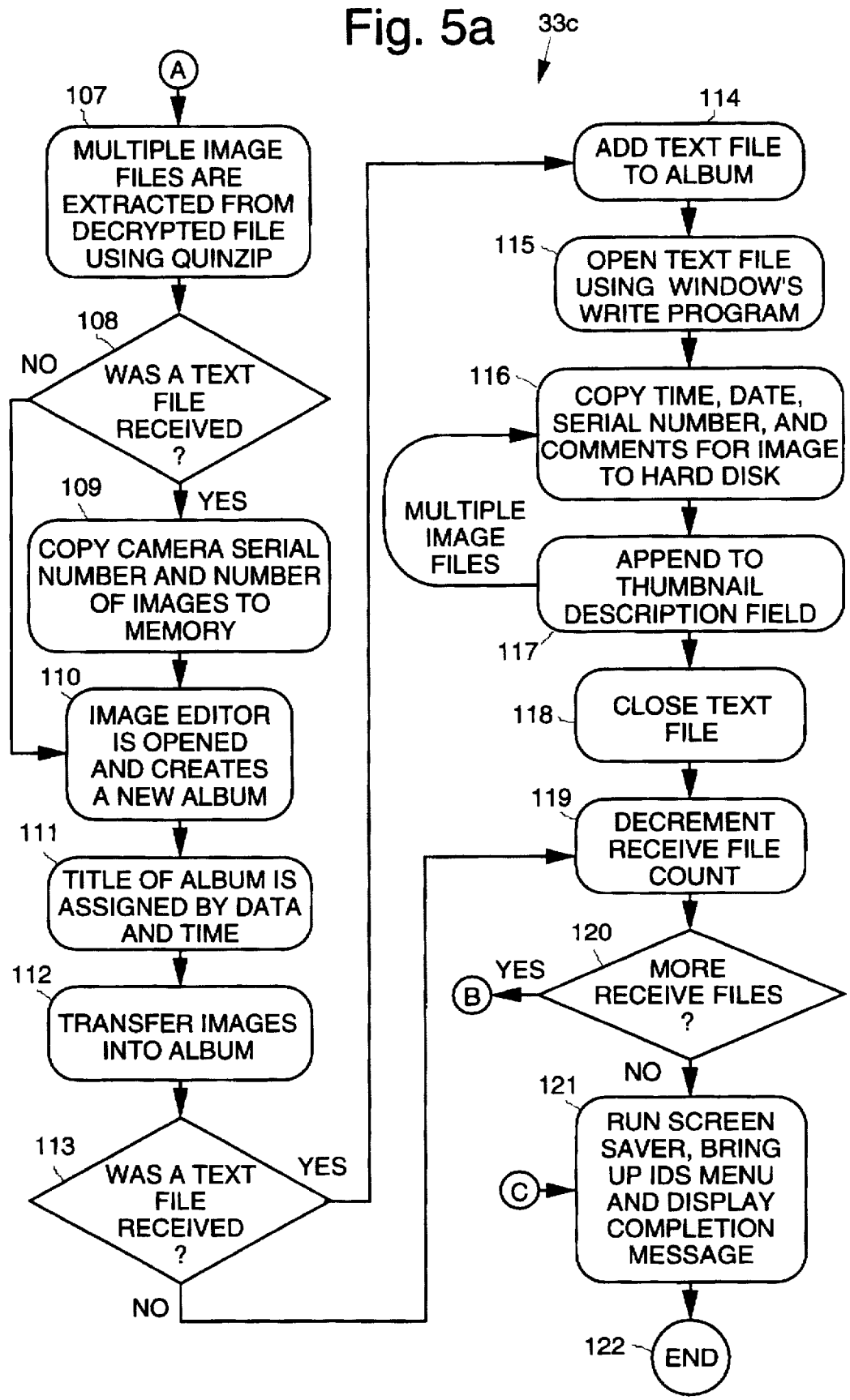

FIGS. 5 and 5a show a flow diagram illustrating the macro performed by activating the transfer modem receive to album icon 33c. Referring to FIG. 5, the Norton Desktop program has been used to create a Norton BatchRunner script 91 that is launched 90 by clicking the icon 33b. The BatchRunner script is programmed to perform the specific tasks shown in FIGS. 5 and 5a. First, the screen saver 35b is disabled 92. Then all empty directories are deleted 93. The macro then launches 94 the modem software, such as Procomm Plus for Windows. The modem 24 is automatically initialized 95 to receive single and multiple files, and all files are transferred to the hard disk drive 15. During file transfer, the operator is prompted 96 with a message dialog box indicating that the system 10 is in a receive mode. Once file transfer has been completed, the operator is prompted 97 to click "OK" to terminate the receive mode, and the modem transfer software is closed 98. The directory is then changed 99 to the directory that contains the received files. The number of received files is counted 100. The operator is then prompted 101 to indicate if any files were received 101 and the macro branches along two different paths, depending upon whether a yes or no answer was indicated. In the event that no files have been received, then the program jumps (C) to a point where it runs the screen saver 35b, the desktop 17 is displayed, and a completion message is displayed to the operator, and the macro ends 123.

If files were received, the macro is programmed to extract 102 the file name from a received file, extract 103 the system ID number from the file name, and look up 104 a password from a database of passwords that are used to implement decryption of the received file. Once a correct password has been determined, the macro launches 105 a macro programmed using the Prokey for Windows utility program. The Prokey macro is used to automatically perform mouse-implemented or keyboard-implemented commands, and is used because of the specific program used to perform decryption requires such commands to be entered. The Prokey macro controls 106 a file decryption program, PC Tools for Windows, to decrypt the received file.

Referring to FIG. 5a, once decryption of the received file is completed, the image files contained in the received file are extracted 107 by launching the QuinZip program. To extract the image files, it is first determined 108 if a text file was received. If a text file was received, the camera serial number and number of images contained in the file is copied 109 to memory. This step is bypassed if no text file was received. Then, the image editor 32b creates 110 a new album 38, and the title of the album 38 is assigned 111 by date and time. The image editor 32b has been programmed to acquire 112 the images and store them in the album 38.

It is again determined 113 whether or not a text file was received. If a text file was received, the text file is added 114 to the album 38. Then, the text file is opened 115 using a writing program that is part of Windows operating system, for example. The writing program has been preprogrammed to copy 116 text comments, the date, the time, and the serial number of the camera 25 to the hard disk drive 15. The copied data is then appended 117 to the thumbnail description field of the image file, and the program loops to extract this data from all image files. Once the text data has been extracted from all files, the text files are closed 18. The received file count is then decremented 119, and it is determined 120 if any more files have been received. If additional files have been received, the program jumps (B) back to extract 102 the file name from the next received file and the processing continues until there are no more files to process. Once it is determined that no more files have been received, the screen saver 35b is run, the desktop 17 is displayed, and a completion message is displayed to the operator, and the macro ends 123.

Figure 6:
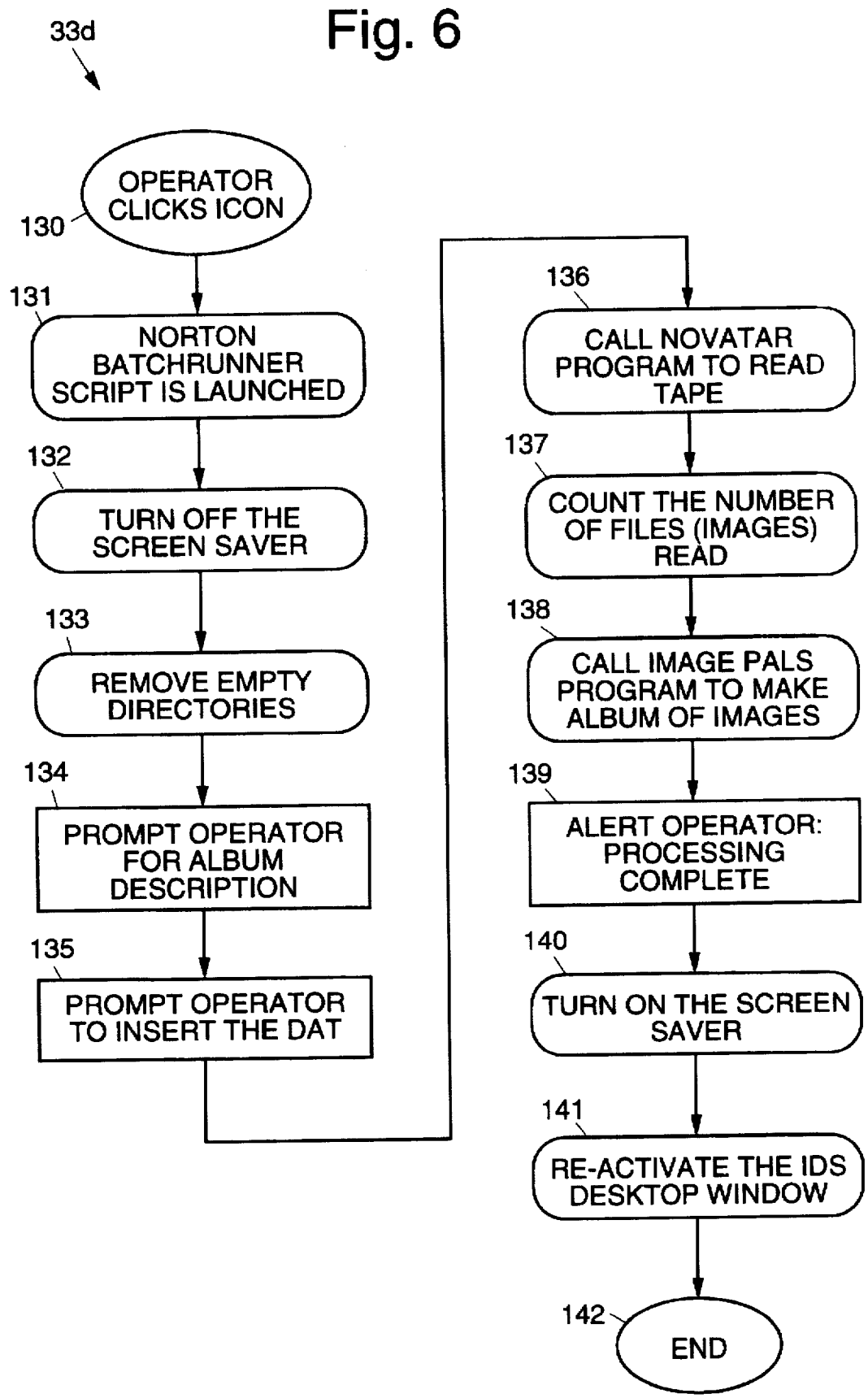

FIG. 6 is a flow diagram illustrating the macro performed by activating the transfer film digitizer tape to album icon 33d. The Norton Desktop program has been used to create a Norton BatchRunner script 131 that is launched 130 by clicking the icon 33d. The BatchRunner script is programmed to perform the specific tasks shown in FIG. 6. First, the screen saver 35b is disabled 132. Then all empty directories are deleted 133. A screen display is generated that prompts 134 the operator for an album description or name, and to insert 135 the digital audio tape into the DAT drive 21. The NovaTAR transfer program has been preprogrammed so that it reads 136 the tape. The number of image files contained on the tape is counted 137. The image editor 32b is then run to construct 138 an album 38 containing the images. Once all images have been read and stored in the album 38, the operator is alerted 139 with a screen prompt that processing has been completed. The screen saver 35b is then run 140, the desktop 17 is displayed 141, and the macro ends 123.

Figure 7:
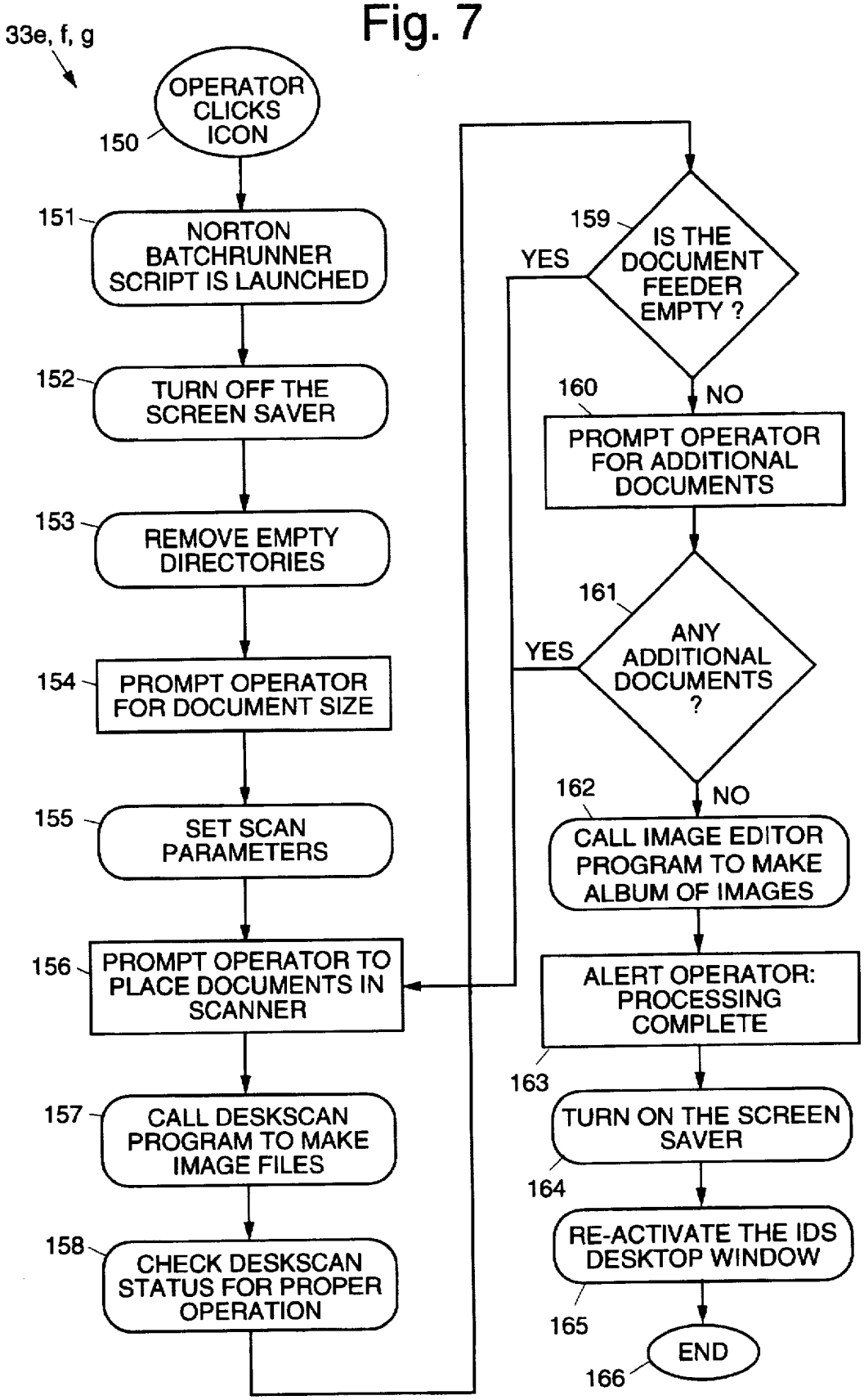

FIG. 7 is a flow diagram illustrating the macro performed by activating of the scan black and white, gray scale, or color image to album icon 33a. The Norton Desktop program has been used to create a Norton BatchRunner script 151 that is launched 150 by clicking the icon 33e, 33f, 33g. The BatchRunner script is programmed to perform the specific tasks shown in FIG. 7. First, the screen saver 35b is disabled 152. Then all empty directories are deleted 153. A screen display is generated that prompts 154 the operator for the size of the document that is to be scanned. The scanning parameters 155 are then set in response to data entered by the operator. The operator is prompted 156 to place documents into the scanner 23. A document scanning program, such as the Deskscan scanner operating software, for example, is then run 157 to create the image files. The macro automatically checks 158 the status of the scanning program for proper operation. After each document is scanned, the document feeder is checked 159 to see if it is empty. If the document feeder is empty, the operator is again prompted 156 to place additional documents in the scanner 23 and the intervening steps are repeated. If the document feeder is empty, then the operator is prompted 160 for additional documents. If additional documents are to be scanned, the operator is again prompted 156 to place additional documents in the scanner 23 and the intervening steps are repeated. If there are no additional documents, the image editor 32b is run 162 to create an album 38 of the images. After the album 38 is created, the operator is prompted 163 that processing is complete. The screen saver 35b is then run 164, the desktop 17 is displayed 165, and the macro ends 166.

Figure 8:
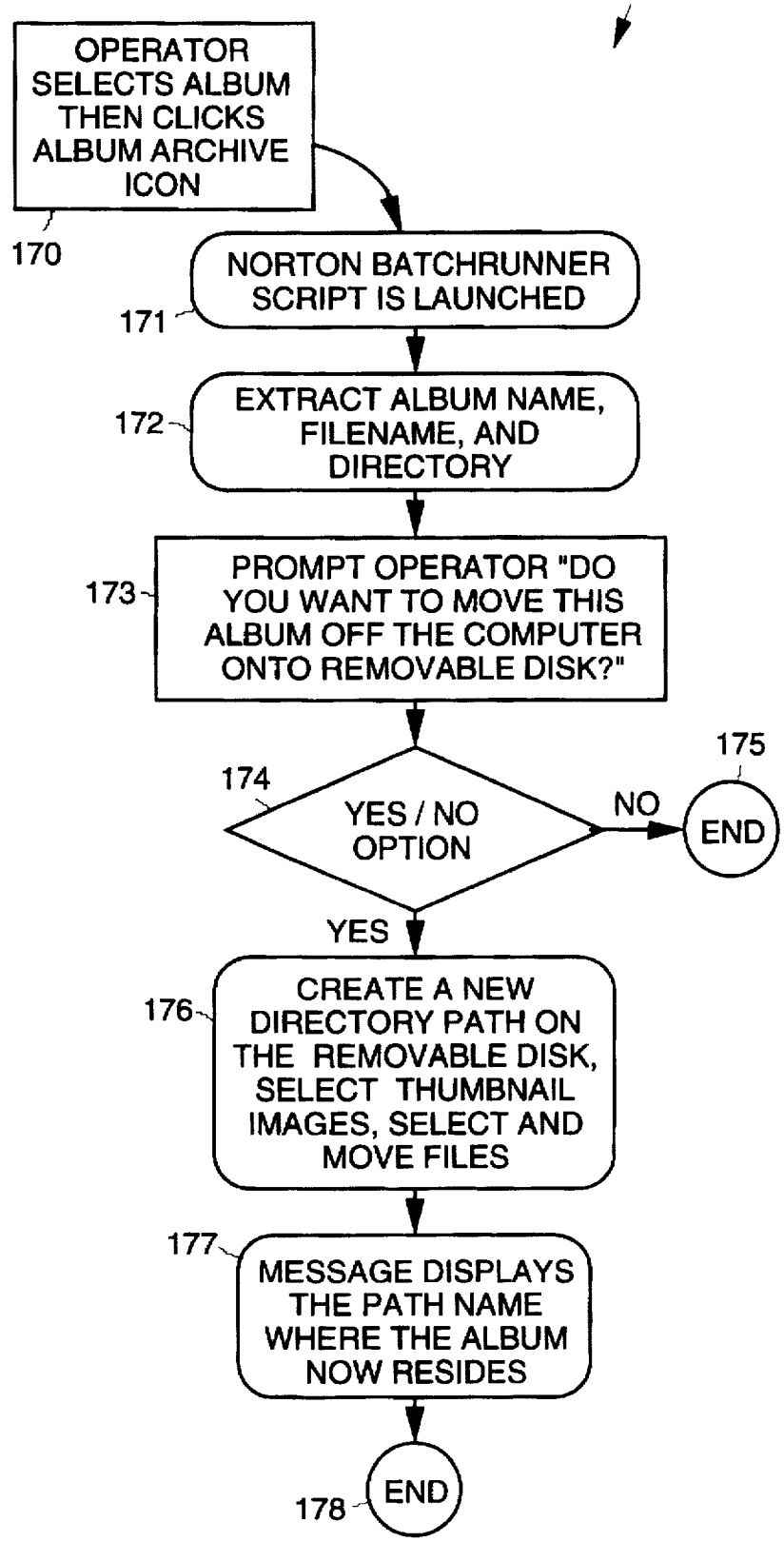

FIG. 8 is a flow diagram illustrating the macro performed by activating the album archive icon 39f located on the album menu 18a shown in FIG. 2a. The album archive icon 39f is used to archive an album 38 to a removable disk. The operator selects an album 38 for archiving and then clicks 170 on the album archive icon 39f. The Norton Desktop program has been used to create a Norton BatchRunner script 171 that is launched when the icon 39f is clicked. The album name, file name and directory are extracted 172 from the selected album 38. The operator is then prompted 174 to determine if the selected album 38 is to be removed from the hard disk drive 5 to the removable disk. If a no answer is selected 174, then the macro ends 175. If a yes answer is selected 176, then a new directory path on the removable disk is created, the thumbnail images 41 for the album 38 are selected, and the image files and thumbnail images 41 are moved to the removable disk. Once archiving is complete, a message is displayed 177 indicating the path name where the album 38 resides on the removable disk, and the macro ends 178.

Figure 9:
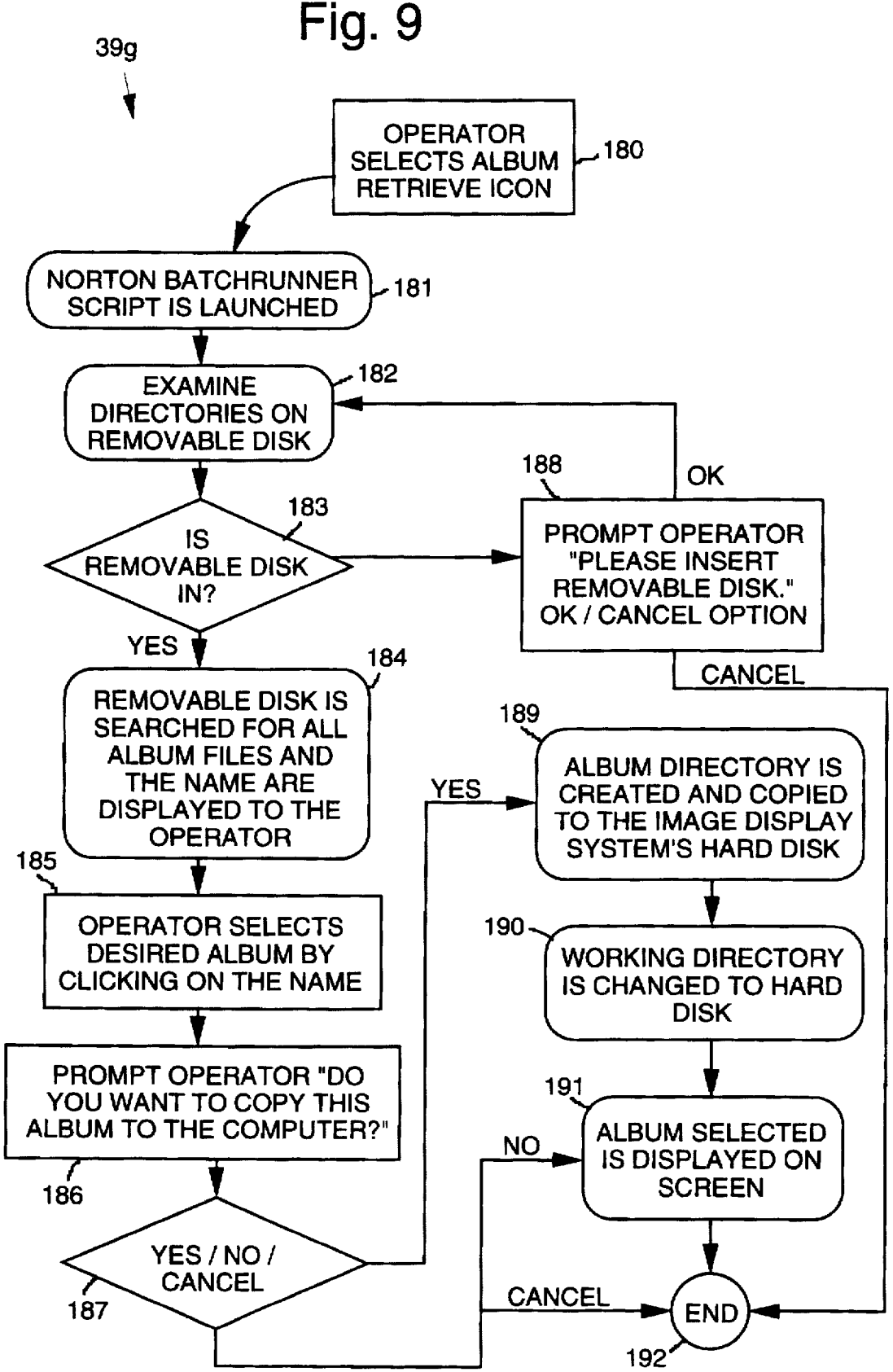

FIG. 9 is a flow diagram illustrating the macro performed by activating the album retrieve icon 39g. The album retrieve icon 39g is used to retrieve an archived album 38 from a removable disk. The operator clicks 180 on the album retrieve icon 39g. The Norton Desktop program has been used to create a Norton BatchRunner script 181 that is launched when the icon 39g is clicked. The directories on all removable disks are first examined 182. The operator is prompted to determined 183 whether a removable disk has been inserted into the disk. If a removable disk is in not the disk drive, then the operator is prompted to insert the removable disk into the drive 22 and continue or cancel the operation. If a removable disk is in the disk drive, then it is searched 184 for all album 38 and the names of the albums 38 are displayed to the operator. The operator then selects 185 a desired album for retrieval by clicking on the name of the album 38. The operator is prompted 186 to determine if the selected album 38 is to be copied to the hard disk drive 15. The operator is then prompted 187 to determine if the album is to be retrieved or not or to cancel the entire macro. If the selected album 38 is to be retrieved, the directory for the retrieved album 38 is created and copied 189 to the hard disk drive 15. The working directory is then changed 190 to the album directory on the hard disk drive 15. The retrieved album 38 is displayed 191 on the album menu 18a, and the macro ends 192. If the selected album 38 is not to be retrieved, the selected album 38 is displayed 191 on the album menu 18a, and the macro ends 192 without retrieving the album. If a decision is made to cancel the macro and not retrieve the album, then the macro ends 192.

Figure 10:
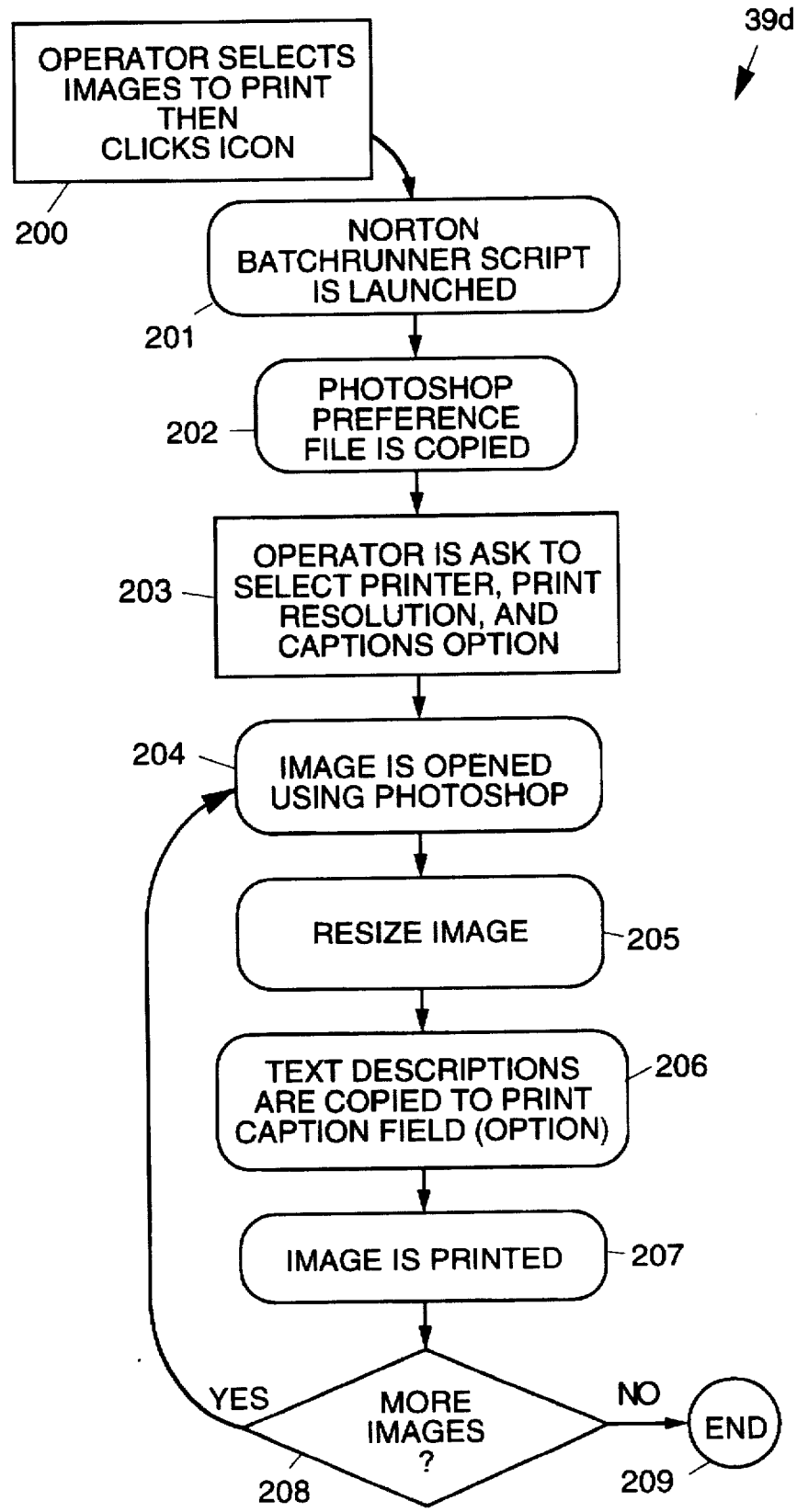
FIG. 10 is a flow diagram illustrating a macro performed by achieving an image printing icon.

FIG. 10 is a flow diagram illustrating the macro performed by activating the image printing icon 39d. The operator selects images that are to be printed and then clicks 200 on the image printing icon 39d. The Norton Desktop program has been used to create a Norton BatchRunner script 201 that is launched when the icon 39d is clicked. A preference file for an image editing program, such as Photoshop 32c, for example, is copied 202. the operator is prompted 203 to select a printer, print resolution and caption. An image is opened 204, using Photoshop 32c for example. The image is resized 205 by scaling it to produce an image that is 8.5 inches by 11 inches. Optionally, text descriptions are copied 206 to the print caption field of the image. The image is then printed 207. If there are additional images, then the next image is opened 204, resized 205, the test descriptions are optionally copied 206, the image is printed 207. This process continues until there are no more images, whereafter the macro ends 209.

A more detailed description of the operation of the system follows. The image display system 10 has been configured to only allow use by authorized users (those with passwords). This is done by invoking the WatchDog security program. After the computer 11 is booted up, a log-on menu is displayed (not shown). There are two valid user types: super and operator. The functionality and differences of each operator are described below. The type of user is entered and then a password is entered. An operator is routed directly to the desktop menu 18 displayed on the monitor 12 after entering his or her password. There is restricted access to the disk drives 16, 21, 22 and portions of the hard drive 16. This prevents the modification of or undesirable removal of system software. The operator is given full capability of performing the automated image processing functions provided by the image display system 10.

A super-type user is a system administrator or support person. A super-type user has access to all of the software used on the image display system 10. After logging on and entering an appropriate password, the super-user is presented with a super-user menu. The super-user can choose to use the icons 30 displayed on the desktop as with the operator, Windows program managers, or use the disk operating system (DOS). On the desktop of the image display system 10, the super user also is given access to all tools and access to all of the disk drives 15, 16, 21, 22.

The desktop of the image display system 10 comprises the desktop menu 18 that presents the tools to an operator to perform several image input operations. In addition, there are icons 30 to access application software to perform image editing (icons 32b, 32c), archiving (icon 32a), and utility functions (icons 34a, 34b). A brief description of each icon 30 is presented below and with appropriate reference to FIGS. 3–10. The step-by-step operation of each tool is described in greater detail below.

All functions of the image display system 10 are initiated from the desktop 17 by clicking the mouse pointer 14 on any of the icons 30 to activate a desired application, function, or utility, which are represented by the different icons 32, 33, 34, 35, 36, 37.

Several tools perform specific functions, which include acquiring image data from the digital camera 25, the digital camera back 25, the scanner 23, or the remote system (such as a photo transmit case). The functions of the image display system 10 automate common image acquisition tasks such as scanning documents and acquiring camera images. These functions of the image display system 10 are used whenever possible to reduce errors and maintain the image organization within the system 10. All functions adhere to filing conventions established for the image display system 10, thereby ensuring that all acquired data may be readily used by other functions.

The help icon 36 allows an operator access to a help menu. The help menu is accessed by clicking on the help icon 36. In the help menu, an operator clicks on highlighted words to obtain more information about the particular item. The help menu is conventional and is similar to help menus available in most popular software packages.

The ImagePals album program is a standalone program that provides the capability to organize and manage document and image files. The use of the ImagePals image editing software to construct macros is easily understood with reference to its user manual and operating instructions. The macro associated with the album icon 32a is configured so that files are grouped into albums. Multiple albums are accessible from the album desktop 18a that is displayed by clicking the album icon 32a. Files in albums 38a, 38b, 38c are visible as thumbnail images that are representations of the stored images.

The ImagePals image editor program 32b is a standalone program that provides the capability to acquire documents and images from the scanner 23, the digital camera 25, or the digital camera back 25. Image and document files may be manipulated, enhanced, and printed by launching this icon 32b. The ImagePals image editor 32b supports TIFF and JPEG file formats. Black and white, gray scale, and color images may also be processed using the ImagePals image editor 32b.

The Photoshop software program 32c is an image editor that is a standalone program that provides the capability to acquire documents and images from the scanner 23, the digital camera 25, or the digital camera back 25. Image and document files may be manipulated, enhanced, and printed from within this program. The Photoshop software program 32c supports TIFF and JPEG file formats.

Procomm modem transfer software 32d is provided as a stand alone application for manually transmitting or receiving program data using the modem 24.

A system backup icon 34a is provided to back up the hard disk drive 15 to a digital audio tape that is inserted into the digital audio tape drive 21. The tape is inserted into the digital audio tape drive 21 and the function is activated from the desktop 17 by clicking the system backup icon 34a. The system backup icon 34a calls a macro that employs the Corel SCSI program to perform the tape backup.

The MO disk format icon 34b is provided to DOS format a magneto-optical disk inserted into the magneto-optical disk drive 22. This function DOS formats the magneto-optical disk. It only formatted blank, corrupted, or Macintosh-formatted disks. It cannot be used to erase a previously DOS formatted magneto-optical disk.

The MO disk to album icon 33a calls a macro that transfers data from a Macintosh magneto-optical disk to an album 38. The MO disk to album icon 33a calls a macro that executes a DOS batch file to format the MO disk with the correct attributes. This icon 33a transfers images from a camera archive file on the Macintosh formatted magneto-optical disk to the album 38. The images in the archive are individually acquired and then transferred to the album 38. Time, date, and serial number of the camera 25 are also extracted and copied to a description field of each thumbnail image 41.

The transfer camera to album icon 33b calls a macro that transfers data from the digital camera 25 and digital camera back 25 to an album 38. This tool transfers images from a Kodak Camera Archive file from either the digital camera 25 or the HitchHiker-type digital camera back 25 to the album 38. Time, date, and serial number of the camera 25 are extracted and copied to the description field of each thumbnail image. The time, data, serial number of the camera 25 and other may be printed with each image as the descriptor field.

The modem receive icon 33c calls a macro that transfers data received over the modem 24 to an album 38. This tool receives images from a remote source via phone lines, for example, unconcatenates the data into individual images, separates images contained in the file, and then stores the images in the album 38. Time, date, and serial number of the camera 25 are extracted, if available, and are copied to the description field of each thumbnail image 41. The image display system 10 can receive, decrypt, and store approximately 50 images per hour over standard telephone lines. Much higher image rates may be achieved over dedicated serial interfaces. The image display system 10 may be use to receive data from multiple remote locations without operator intervention.

The transfer DAT tape to album icon 33d calls a macro that transfers data from film digitizer tape to an album 38. This tool transfers images from a film digitizer TAR (tape, archive and restore) formatted digital audio tape to the album 38.

The scan black and white image icon 33e calls a macro that scans a black and white image to an album 38. This tool scans documents for storage into the album 38. Each scanned page is stored as a file in the specified file storage format. The setup and operation of the scanner 23 is automated for multiple-page documents. The scan gray scale image icon 33f calls a macro that scans a gray scale image to the album 38. This tool 30 scans documents and pictures for storage into an album 38. Each scanned page is stored as a file in the specified file storage format. The scan color image icon 33f calls a macro that scans a color image to an album 38. This tool 30 scans color pictures for storage into the album 38. Each scanned page is stored as a file in the specified file storage format.

A WatchDog Keylock utility icon 35a launches the WatchDog standalone security program. Activating this utility icon 35a allows the operator to blank the display screen of the monitor 12 and lock the keyboard 13 by pressing <ctrl><alt>L keys at the same time. Clicking on this icon 35a does not activate any other tool 30. A screen saver utility icon 35b is also provided that automatically blanks the display screen of the monitor 12 when the system 10 has not been in use for a preset amount of time.

A slide show icon 37 calls a macro that displays sample images acquired or received by the image display system 10. The slide show is launched by clicking on the slide show icon 37. The escape key is used to exit from this application. The slide show terminates in the album menu 18a and exits the album menu 18a to return to the desktop 17 of the image display system 10.

Automated desktop icons 30 are provided in the album menu 18a. These include an image print icon 39d, an album archive icon 39f and an album retrieve icon 39g. The image print function calls a macro that allows an operator to select one or multiple images from an image album 38 and send them to the printer 26, 27. There is no maximum number of images that can be printed at one time, which is a limitation in some software packages, such as Photoshop, for example. This function resizes (increases or decreases) each image to best fit an 8×11 sheet of paper. The image archive function allows an operator to move an entire album 38 of images to a removable disk media. This function copies the entire directory structure to the archive disk media. Thumbnail images 41, images, and text files are moved. The data is completely removed from the hard disk drive 15 of the image display system 10. The image retrieve function searches through removable media for image albums 38 that have been archived. The operator is given an option of working from the removable media or copying the albums 38 or images to the hard disk drive 15. This function is used in conjunction with the album archive icon 39f to provide a removable indexed archive system for large numbers of images (tens of thousands).

Thus, an image display system that provides for the acquisition and archiving of images derived from multiple sources with minimal operator interaction and understanding of the archiving computer system has been disclosed. It is to be understood that the described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An image display system for acquiring and archiving image files, said system comprising:

a computer;

a hard disk drive coupled to the computer;

an archive storage medium coupled to the computer;

a monitor coupled to the computer;

a keyboard coupled to the computer;

a modem coupled to the computer for receiving image files from a remotely located source; and a mouse pointer coupled to the computer, said mouse pointer having a cursor that is displayed on the monitor and that is moved by an operator to select predefined graphical icons displayed on the monitor that are representative of the hard disk drive, applications, and image acquisition tools, and wherein the graphical icons are constructed so that an operator can only perform a predetermined set of functions that correspond to the graphical icons, and wherein each of the icons comprises a set of linked macro functions that initialize the modem, control image file transfer from the remotely located source by way of the modem, and format received image files into a predetermined format, attach textual data to the image files, and automatically archive the image files.

2. The system of claim 1 further comprising a digital audio tape drive, and wherein a graphical icon is displayed on the monitor that comprises a macro that automatically transfers files from the digital audio tape drive to the hard disk drive.

3. The system of claim 1 further comprising an interface for connecting to a digital photographic image source to permit transfer of images therefrom, and wherein a graphical icon is displayed on the monitor that comprises a macro that automatically transfers the images from the digital photographic image source to the hard disk drive.

4. The system of claim 1 further comprising a scanner coupled to the computer for scanning images into the computer, and wherein graphical icons are displayed on the monitor that comprise macros that automatically scan documents into the hard disk drive from the scanner.

5. The system of claim 1 further comprising at least one printer coupled to the computer for printing image files, and wherein a graphical icon is displayed on the monitor that comprises a macro that automatically prints the image files.

6. An image display system for acquiring and archiving image files derived from multiple sources, said system comprising:
   a computer;
   a hard disk drive coupled to the computer;
   a digital audio tape drive coupled to the computer;
   a magneto-optical disk drive coupled to the computer;
   a monitor coupled to the computer;
   a keyboard coupled to the computer;
   an interface coupled to the computer for connecting to a digital photographic image source to permit transfer of images therefrom;
   a mouse pointer coupled to the computer, said mouse pointer having a cursor that is displayed on the monitor and that is moved by an operator to select predefined graphical icons displayed on the monitor that are representative of the disk drives, applications, image acquisition tools, utility functions, and a display function;
   a scanner coupled to the computer for scanning images into the computer;
   a modem coupled to the computer for receiving image files from a remotely located source; and
   at least one printer coupled to the computer for printing image files;
   and wherein the graphical icons are constructed so that an operator can only perform a predetermined set of functions that correspond to the graphical icons, and wherein each of the icons comprises a set of linked macro functions that initialize the modem, control image file transfer from the remotely located source by way of the modem, from the scanner, from the digital photographic image source, from the digital audio tape drive, and from the disk drives, and format received image files into a predetermined format, attach textual data to the image files, and automatically archive and print the image files as a function of the selected icon.

7. The system of claim 6 wherein a graphical icon is displayed on the monitor that comprises a macro that automatically transfers files from the digital audio tape drive to the hard disk drive.

8. The system of claim 6 wherein a graphical icon is displayed on the monitor that comprises a macro that automatically transfers the images from the digital photographic image source to the hard disk drive.

9. The system of claim 6 wherein graphical icons are displayed on the monitor that comprise macros that automatically scan documents into the hard disk drive from the scanner.

10. The system of claim 6 wherein a graphical icon is displayed on the monitor that automatically prints the image files.

11. A method of acquiring and archiving image files derived from a remotely located source, said method comprising the steps of:
   providing a computer system comprising a computer, a hard disk drive, an archive storage medium, a monitor, a keyboard, a modem for receiving image files from the remotely located source, and a mouse pointer having a cursor that is displayed on the monitor;
   constructing a plurality of graphical icons that are displayed on the monitor that limit operator control of the computer system to a predetermined set of image acquisition and archiving functions, and that comprise a set of linked macro functions that initialize the modem, control image file transfer from the remotely located source by way of the modem, format received image files into a predetermined format, attach textual data to the image files, and automatically archive image files onto the archive storage medium;
   activating a predetermined icon to initialize the modem and transfer image files from the remotely located source to the hard disk drive by way of the modem, format received image files into a predetermined format, attach textual data to the image files, and archive the image files with attached textual data.

12. A method of acquiring and archiving image files derived from a plurality of sources, said method comprising the steps of:
   providing a computer system comprising a computer, a hard disk drive, a magneto-optical disk drive, a monitor, a keyboard, a modem for receiving image files from a remotely located source, a digital audio tape drive, an interface for connecting to a digital photographic image source, a scanner, and a mouse pointer having a cursor that is displayed on the monitor;
   constructing a plurality of graphical icons that are displayed on the monitor that limit operator control of the computer system to a predetermined set of image acquisition and archiving functions, and that comprise a set of linked macro functions that initialize the modem, control image file transfer from the remotely located source to the hard disk drive by way of the modem, format received image files into a predetermined format, attach textual data to the image files, and automatically archive image files;
   disposing a magneto-optical disk in the magneto-optical disk drive;
   activating a predetermined icon to initialize the modem and transfer image files from the remotely located source to the hard disk drive by way of the modem, format received image files into a predetermined format, attach textual data to the image files, and archive the image files with attached textual data.

13. The method of claim 12 further comprising the step of activating a predetermined icon that comprises a macro that automatically transfers files from the digital audio tape drive to the hard disk drive.

14. The method of claim 12 further comprising the step of activating a predetermined icon that comprises a macro that automatically transfers the images from the digital photographic image source to the hard disk drive.

15. The system of claim 12 further comprising the step of activating one of a plurality of predetermined icons that comprise macros that automatically scan documents into the hard disk drive from the scanner.

* * * * *